US012574741B2

(12) United States Patent
Nakazato et al.

(10) Patent No.: US 12,574,741 B2
(45) Date of Patent: Mar. 10, 2026

(54) MANAGEMENT DEVICE, MANAGEMENT METHOD, AND MANAGEMENT PROGRAM FOR GENERATING RESOURCE BLOCK SCHEDULES

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 508 days.

(21) Appl. No.: 18/040,164

(22) PCT Filed: Dec. 28, 2021

(86) PCT No.: PCT/JP2021/048798
§ 371 (c)(1),
(2) Date: Feb. 1, 2023

(87) PCT Pub. No.: WO2023/127100
PCT Pub. Date: Jul. 6, 2023

(65) Prior Publication Data
US 2024/0259818 A1      Aug. 1, 2024

(51) Int. Cl.
*H04W 16/10* (2009.01)
*H04W 88/08* (2009.01)

(52) U.S. Cl.
CPC .......... *H04W 16/10* (2013.01); *H04W 88/085* (2013.01)

(58) Field of Classification Search
CPC ... H04W 16/10; H04W 88/085; H04W 28/16; H04W 72/12; H04W 88/08; H04W 16/00–24; H04W 16/32; H04W 28/00–0205; H04W 28/0226–0247;
(Continued)

(56) References Cited

U.S. PATENT DOCUMENTS 10,327,213 B1 *   6/2019   Han .................. H04W 52/0206

OTHER PUBLICATIONS

"3rd Generation Partnership Project; Technical Specification Group Radio Access Network; Coordinated multi-point operation for LTE physical layer aspects (Release 11)", 3GPP TR 36.819 V11.1.0, Technical Report, Release 11, Dec. 2011, pp. 1-69.

* cited by examiner

*Primary Examiner* — Ronald Eisner
(74) *Attorney, Agent, or Firm* — Sughrue Mion, PLLC

(57) ABSTRACT

A management device communicably connected with first and second Distributed Units (DUs) communicably connected with first and second groups of Radio Units (RUs), the management device including one or more processors that, when regrouping an RU to be regrouped among the first group of RUs by terminating a connection with the first DU and newly communicably connecting with the second DU, execute processes of: acquiring information regarding first and second schedules, which are followed respectively by the first and second groups of RUs before regrouping; generating third and fourth schedules, which are to be followed respectively by the first and second groups of RUs after the regrouping, and which are assumed to be such that interference will not logically occur between the regrouped RU and the other RUs in the first and seconds group after regrouping; and supplying the third and fourth schedules to the first and second DUs, respectively.

7 Claims, 9 Drawing Sheets

(58) Field of Classification Search
CPC ..... H04W 28/08; H04W 28/086–0861; H04W
72/04–046; H04W 72/52
See application file for complete search history.

"Prior Art"

Interference occurring

1000

Monitor each DU ~1100

Detect interference/imbalance ~1200

Determine RU to be regrouped ~1300

Acquire schedules of
DUs before regrouping ~1400

Reschedule DU resources ~1500

Execute regrouping ~1600

MANAGEMENT DEVICE, MANAGEMENT METHOD, AND MANAGEMENT PROGRAM FOR GENERATING RESOURCE BLOCK SCHEDULES

CROSS REFERENCE TO RELATED APPLICATIONS

This application is a National Stage of International Application No. PCT/JP2021/048798 filed Dec. 28, 2021.

TECHNICAL FIELD

The present disclosure relates to a management device, a management method, and a management program for managing the configuration of a base station.

BACKGROUND

In fifth-generation mobile communication systems (5G: 5th Generation mobile communication systems), network systems compliant with O-RAN (Open RAN) are drawing interest for the purpose of realizing C-RAN (Centralized Radio Access Network) architecture. In O-RAN-compliant network systems, a base station is constituted by a logical node known as a Distributed Unit (DU) having lower-layer functions including at least those of the physical (PHY) layer, a logical node known as a Central Unit (CU) having higher-layer functions including those of a radio resource control (RRC) layer, and a Radio Unit (RU) corresponding to an antenna. The CU is capable of connecting with multiple DUs via a network called a midhaul network. Additionally, the DUs are capable of connecting with multiple RUs via a network called a fronthaul network. A configuration (multi-DU environment) is adopted wherein the RUs form sectors, and a single DU accommodates multiple sectors. Furthermore, the multiple sectors form a cell served by the base station, and multiple cells form the coverage area of the communication system.

FIG. 1 is a diagram illustrating an example of the coverage area formed by a base station (BS) #1 and a BS #2. FIG. 1 illustrates an example in which a cell #1 served by the BS #1 and a cell #2 served by the BS #2 are each constituted by three sectors. The respective sectors are each formed by different RUs.

In other words, regarding the BS #1, the cell #1 has a sector #1 corresponding to an RU #1, a sector #2 corresponding to an RU #2, and a sector #3 corresponding to an RU #3. Regarding the BS #2, the cell #2 has a sector #4 corresponding to an RU #4, a sector #5 corresponding to an RU #5, and a sector #6 corresponding to an RU #6.

In each of the BS #1 and the BS #2, coordinated transmission and reception (Coordinated Multi-point transmission/reception, hereinafter abbreviated to "CoMP") technology is used, thereby preventing interference in each cell and allowing the spectrum usage to be increased. In Non-Patent Document 1, coordinated beam forming (CB) or coordinated scheduling (CS) is considered as a CoMP method.

However, in order to deal with interference occurring in areas where cells overlap, multiple base stations must be coordinated by means of complicated control and CoMP must be implemented between cells.

Meanwhile, various services making use of high-speed communication have begun to spread, and further development is expected in the future. However, while demand for high-speed, high-capacity communication is increasing for high-quality video, virtual reality, augmented reality, and the like, low-speed communication or low-capacity communication is still popular for snapshot photography, text, or the like. Compared with the radio resources or physical resources sought in radio access network base stations for high-speed, high-capacity communication, few resources are necessary for low-speed communication or low-capacity communication. Under such circumstances, resource allocation that takes into account complicated demand elements in which multiple use cases coexist is becoming necessary.

CITATION LIST

Non-Patent Literature

Non-Patent Document 1: 3GPP TR 36.819 V11.1.0 (2011 December) $3^{rd}$ Generation Partnership Project; Technical Specification Group Radio Access Network; Coordinated Multi-Point Operation for LTE Physical Layer Aspects (Release 11)

SUMMARY OF INVENTION

Technical Problem

The present disclosure was proposed in order to solve at least one of the problems of the conventional art, and an objective of the present disclosure is to provide a management device, a management method, and a management program that make efficient use of a RAN not involving complicated control between cells.

Solution to Problem

One embodiment of the management device according to the present disclosure is a management device communicably connected with a first DU communicably connected with a first group of RUs and a second DU communicably connected with a second group of RUs. The management device comprises one or more processors.

When regrouping an RU to be regrouped among the first group of RUs by terminating a connection with the first DU and newly communicably connecting with the second DU, the one or more processors execute operations including:

acquiring information regarding a first schedule, which is a resource block schedule followed by the first group of RUs before the regrouping;

acquiring information regarding a second schedule, which is a resource block schedule followed by the second group of RUs before the regrouping; and generating, based on at least the information regarding the first schedule and the information regarding the second schedule, a third schedule and a fourth schedule.

In this case, the third schedule is a resource block schedule to be followed by the first group of RUs after the regrouping. The fourth schedule is a resource block schedule to be followed by the second group of RUs after the regrouping.

Furthermore, the third schedule and the fourth schedule are assumed to be such that interference will not logically occur between the RU that was regrouped and the other RUs included in the first group and in the second group after the regrouping.

The operations further include:

supplying the third schedule to the first DU; and supplying the fourth schedule to the second DU.

In the fourth schedule, a resource block for the RU to be regrouped may be added at a time and frequency position that is not allocated to any of the RUs in the second schedule.

In the third schedule, a resource block for the RU to be regrouped may be deleted from the first schedule.

In the third schedule and the fourth schedule, for a first resource block in the third schedule and a second resource block in the fourth schedule, which are both located at the same time and frequency position, interference may be prevented from occurring between a first RU using the first resource block and a second RU using the second resource block.

The one or more processors may further execute processes of supplying the first DU with an instruction to terminate the connection with the RU to be regrouped; supplying the second DU with an instruction to establish a connection with the RU to be regrouped; supplying the first DU with a communication instruction based on the third schedule; and supplying the second DU with a communication instruction based on the fourth schedule.

One embodiment of the management method according to the present disclosure is a method for managing a radio access network including a first DU communicably connected with a first group of RUs and a second DU communicably connected with a second group of RUs.

When regrouping an RU to be regrouped among the first group of RUs by terminating a connection with the first DU and newly communicably connecting with the second DU, the method includes processes of:

acquiring information regarding a first schedule, which is a resource block schedule followed by the first group of RUs before the regrouping;

acquiring information regarding a second schedule, which is a resource block schedule followed by the second group of RUs before the regrouping; and generating, based on at least the information regarding the first schedule and the information regarding the second schedule, a third schedule and a fourth schedule.

In this case, the third schedule is a resource block schedule to be followed by the first group of RUs after the regrouping. The fourth schedule is a resource block schedule to be followed by the second group of RUs after the regrouping.

Furthermore, the third schedule and the fourth schedule are assumed to be such that interference will not logically occur between the RU that was regrouped and the other RUs included in the first group and in the second group after the regrouping.

The method further includes:

supplying the third schedule to the first DU; and supplying the fourth schedule to the second DU.

One embodiment of the storage medium according to the present disclosure is a computer-readable non-transitory storage medium storing program commands for one or more processors in a management device. The program commands, when executed by the one or more processors, in a first DU communicably connected with a first group of RUs and a second DU communicably connected with a second group of RUs, when regrouping an RU to be regrouped among the first group of RUs by terminating a connection with the first DU and newly communicably connecting with the second DU, making the one or more processors execute operations including:

acquiring information regarding a first schedule, which is a resource block schedule followed by the first group of RUs before the regrouping;

acquiring information regarding a second schedule, which is a resource block schedule followed by the second group of RUs before the regrouping; and generating, based on at least the information regarding the first schedule and the information regarding the second schedule, a third schedule and a fourth schedule.

In this case, the third schedule is a resource block schedule to be followed by the first group of RUs after the regrouping. The fourth schedule is a resource block schedule to be followed by the second group of RUs after the regrouping.

Furthermore, the third schedule and the fourth schedule are assumed to be such that interference will not logically occur between the RU that was regrouped and the other RUs included in the first group and in the second group after the regrouping.

The operations further include:

supplying the third schedule to the first DU; and supplying the fourth schedule to the second DU.

DESCRIPTION OF EMBODIMENTS

Hereinafter, an embodiment in the present disclosure will be explained in detail with reference to the drawings.

Embodiments

Figure 2:
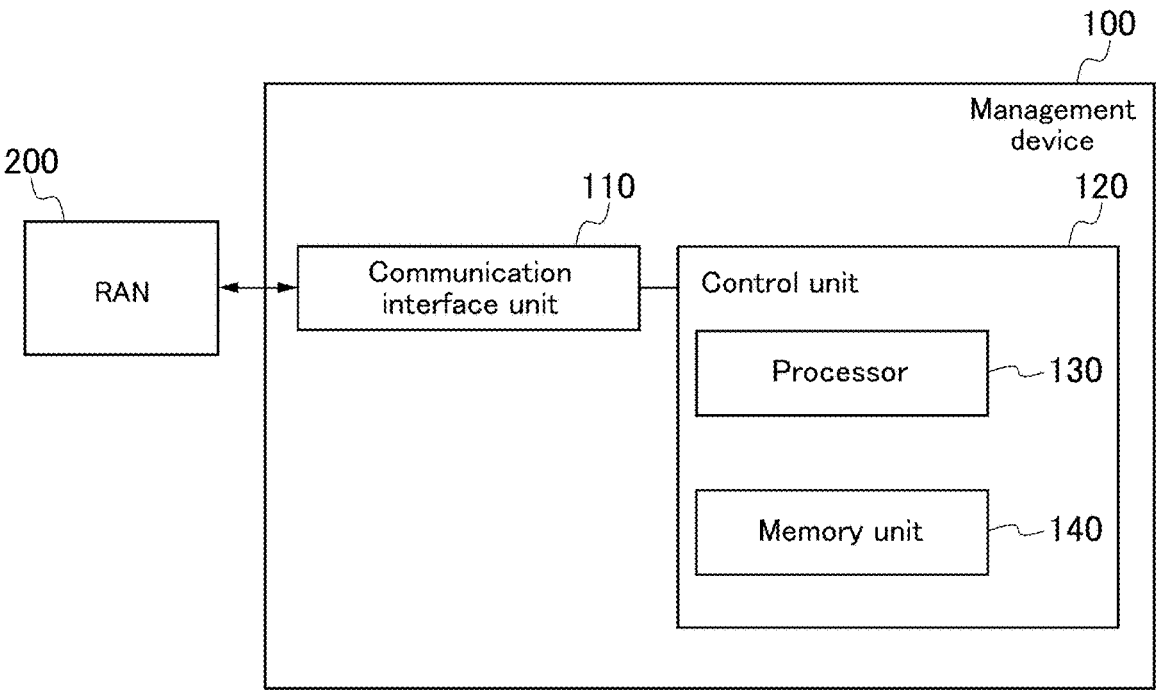
FIG. 2 is a diagram illustrating a management device in an example according to an embodiment.

FIG. 2 illustrates a block diagram of a management device 100 in which a first embodiment of the present disclosure can be implemented. The management device 100 is provided with a communication interface unit 110 and a control unit 120. The control unit 120 includes one or more processors 130, or one or more memory units 140.

The communication interface unit 110 mediates the connection between the management device 100 and the radio access network (RAN) 200.

The control unit 120 is configured to allow a base station in the RAN 200 to be controlled through the communication interface unit 110.

The one or more processors 130 operate the control unit 120. The one or more memory units 140 can store commands, data, and the like for the one or more processors 130.

Before explaining the management device 100 according to the embodiment in more detail, the RAN controlled by the management device 100 will be explained.

(Regarding the RAN Configuration)

A RAN in an O-RAN-compliant network system is configured to include a Central Unit (CU), a Distributed Unit (DU), and a Radio Unit (RU).

Of the CU, the DU and the RU in the RAN, the functions of the CU and/or the DU can be configured by means of virtualization. By virtualizing the functions of the CU and/or the DU to form a virtualized CU (vCU) and/or a virtualized DU (vDU), a general-purpose server can be used instead of the dedicated server that was necessary for configuring a RAN until now, and a RAN can be be inexpensively and flexibly constructed. Furthermore, the impact on services when a malfunction occurs can be held to a minimum.

Figure 1:
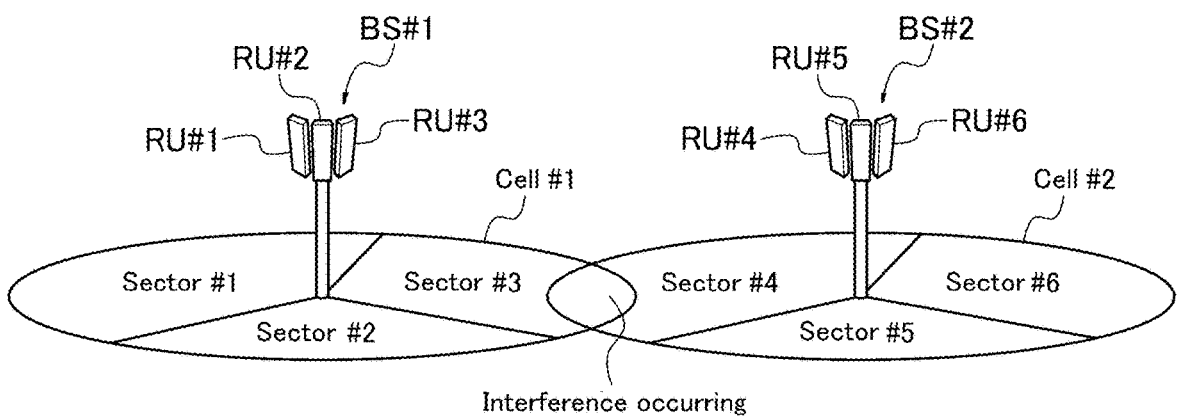
FIG. 1 is a diagram illustrating an example of a coverage area formed by two base stations.
Figure 3:
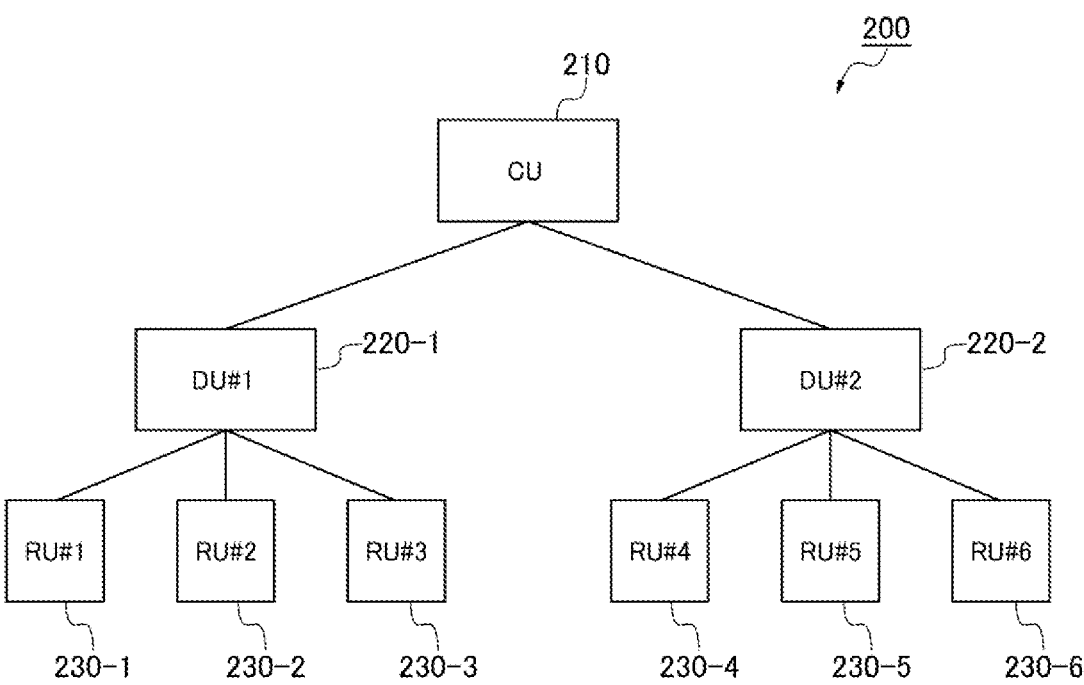
FIG. 3 is a diagram illustrating an example of the configuration of a RAN forming the coverage area in FIG. 1.

FIG. 3 is a diagram illustrating an example of the configuration of a RAN 200 forming the coverage area illustrated in FIG. 1. The RAN 200 is provided with a CU 210, a DU 220-1 and a DU 220-2 (hereinafter, the DU 220-1 and the DU 220-2 will be referred collectively as the DUs 220), and an RU 230-1, an RU 230-2, an RU 230-3, an RU-230-4, an RU 230-5, and an RU 230-6 (hereinafter, the RU 230-1 to the RU 230-6 will be referred to collectively as the RUs 230).

The DU 220-1 and the DU 220-2 are connected to the CU 210. Additionally, three RUs, namely, the RU 230-1, the RU 230-2, and the RU 230-3 (as in FIG. 1, hereinafter, each referred to, in order, as the "RU #1", the "RU #2", and the "RU #3") are connected to the DU 220-1 (hereinafter also referred to as the "DU #1"), and three RUs, namely, the RU 230-4, the RU 230-5, and the RU 230-6 (as in FIG. 1, hereinafter, each referred to, in order, as the "RU #4", the "RU #5", and the "RU #6") are connected to the DU 220-2 (as in FIG. 1, hereinafter also referred to as the "DU #2").

Each of the RUs 230 form one or more beams, for example, by beam forming, and use one of the beams to establish a connection with a User Equipment (UE) (not illustrated). Additionally, the RU #1, the RU #2, the RU #3, the RU #4, the RU #5, and the RU #6 respectively form the sector #1, the sector #2, the sector #3, the sector #4, the sector #5, and the sector #6 in FIG. 1. As illustrated in FIG. 1, there are cases in which interference occurs in the area where the sector #3 and the sector #4 overlap. In other words, these are cases in which there is a possibility of interference occurring between signals exchanged with the RU #3 and signals exchanged with the RU #4.

Figure 4:
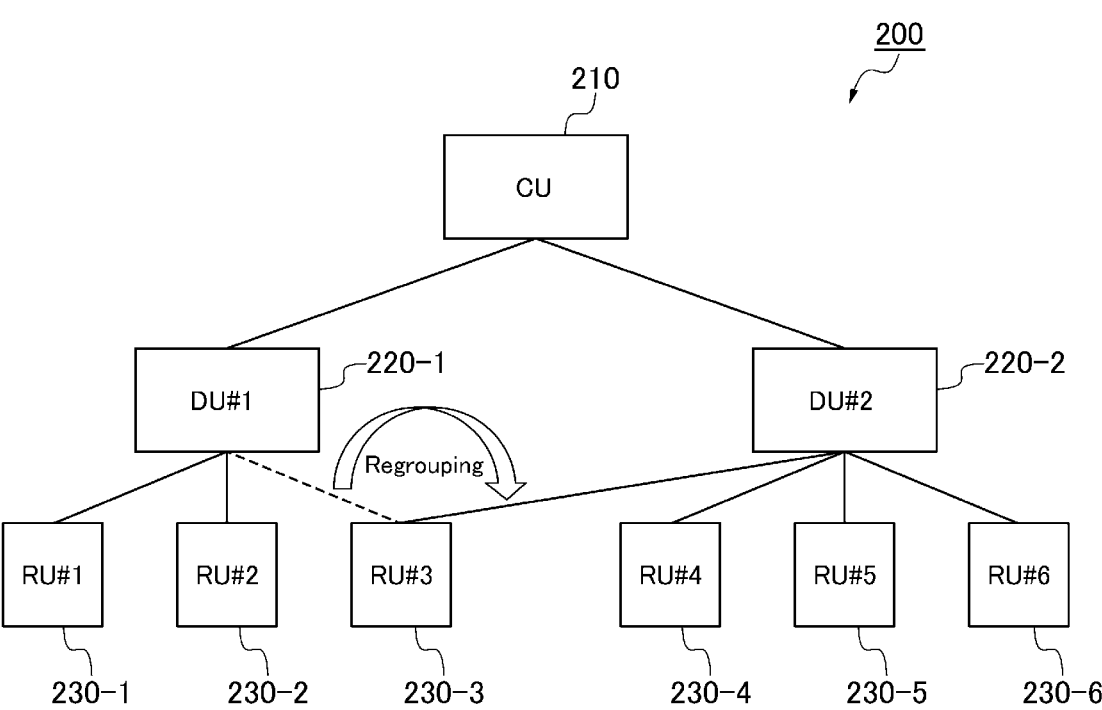
FIG. 4 is a diagram illustrating an example of the configuration of the RAN after the connections between the RUs and vDUs have been regrouped according to an embodiment.

FIG. 4 illustrates the configuration of the RAN 200 after the connection destination DU of a certain RU is changed and the connections between the RUs and the DUs are regrouped according to an embodiment in the present disclosure.

FIG. 4 illustrates an example in which a certain RU (for example, the RU #3) has terminated the connection with the first DU (hereinafter also referred to as the DU #1) and a connection has been established with a second DU (hereinafter also referred to as the DU #2) different from the first DU. In FIG. 4, the dashed line between the DU #1 and the RU #3 represents a terminated connection and the solid line between the DU #2 and the RU #3 represents an established connection. Such a change in the connection destination DU of an RU is referred to as "regrouping" and the RU for which the connection destination is to be changed is called an "RU to be regrouped".

In the present embodiment, such regrouping is performed. For example, if there is a heavy load on the DU #1, in other words, if the resources in the DU #1 are strained, then at least one of the RU #1, the RU #2, and the RU #3 connected to the DU #1 may be determined as the RU to be regrouped, and the RU to be regrouped may be connected to the DU #2. Said resources may be physical resources or may be radio resources. Physical resources include, for example, CPU, memory, and the like allocated to the DU. Radio resources include, for example, frequency bands and the like allocated to the DU.

Additionally, the first RU (RU #3) and the second RU (RU #4) between which interference could occur may both be connected to the same DU (DU #2). As mentioned below, in the present embodiment, each DU is controlled so that the RUs connected thereto do not interfere with each other. Therefore, when the RU #3 and the RU #4 are connected to the same DU #2, control for preventing interference is implemented in the DU #2, and the RU #3 and the RU #4 do not interfere.

For the purpose of avoiding interference, the RU #3 and the RU #4 between which interference was occurring may both be connected to the same DU #1 instead of the RU #3 and the RU #4 both being connected to the same DU #2.

However, when regrouping the connections, the resources of the DU #1 and the DU #2 may be strained after the regrouping. For example, suppose that the available resources in the DU #1 and the available resources in the DU #2 before regrouping have been compared. In this case, when there are less available resources in the DU #1, if both the RU #3 and the RU #4 are connected to the same DU #1, then there is a possibility that the resources in the DU #1 will be strained. Thus, in this case, it can be considered to be better to regroup the connection destination of the RU #3 so that the RU #3 and the RU #4 are connected to the DU #2, which has more available resources. In FIG. 4, the RU #3 can be considered to be chosen in order to regroup the connection destination by such a procedure.

On the other hand, regarding the other RUs (RU #1 and RU #2) that were connected to the same DU #1 along with the RU #3 before the connection destination DU of the RU #3 was changed, interference between the other RUs (RU #1 and RU #2) and the RU #3 can no longer be prevented by the DU #1 after the connection destination of the RU #3 is changed to the DU #2.

In other words, even after the connection destination DU for a certain RU has been changed, in the DU to which that RU was originally connected and the DU to which that RU has been newly connected, the DUs must reset (reschedule) the allocation of radio resources to the respective RUs so that interference will not occur. Rescheduling will be explained in more detail below.

Next, an example relating to rescheduling according to an embodiment of the present disclosure will be explained. In order to do so, the moment at which the control unit 120 of the management device 100 in FIG. 2 has determined, regarding a first RU (for example, the RU #3) connected to a first DU (for example, the DU #1) and a second RU (for example, the RU #4) connected to a second DU (for example, the DU #2), that the connection destination DU for either the first or the second RU (for example, the RU #3) is to be changed to make the connection destination DU of the first and second RUs the same will be considered in further detail.

More specifically speaking, at this moment, it has been determined that the connection destination DU of either the first or the second RU (RU #3) is to be changed. However, the control unit 120 has not yet executed the change of the connection destination DU for that RU.

In an embodiment of the present disclosure, when one or more RUs are connected to a certain DU, the resources for radio communication with the DU per frame are allocated to (scheduled for) the respective RUs. The respective RUs perform radio communication in accordance with said allocation (schedule). More specifically speaking, radio communication is performed in time intervals indicated by said allocation (schedule), using frequencies indicated by said allocation (schedule). Said radio communication is assumed to be downlink communication, but may be uplink communication. Said allocation is represented by an arrangement of resource blocks in a resource grid.

Figure 5:
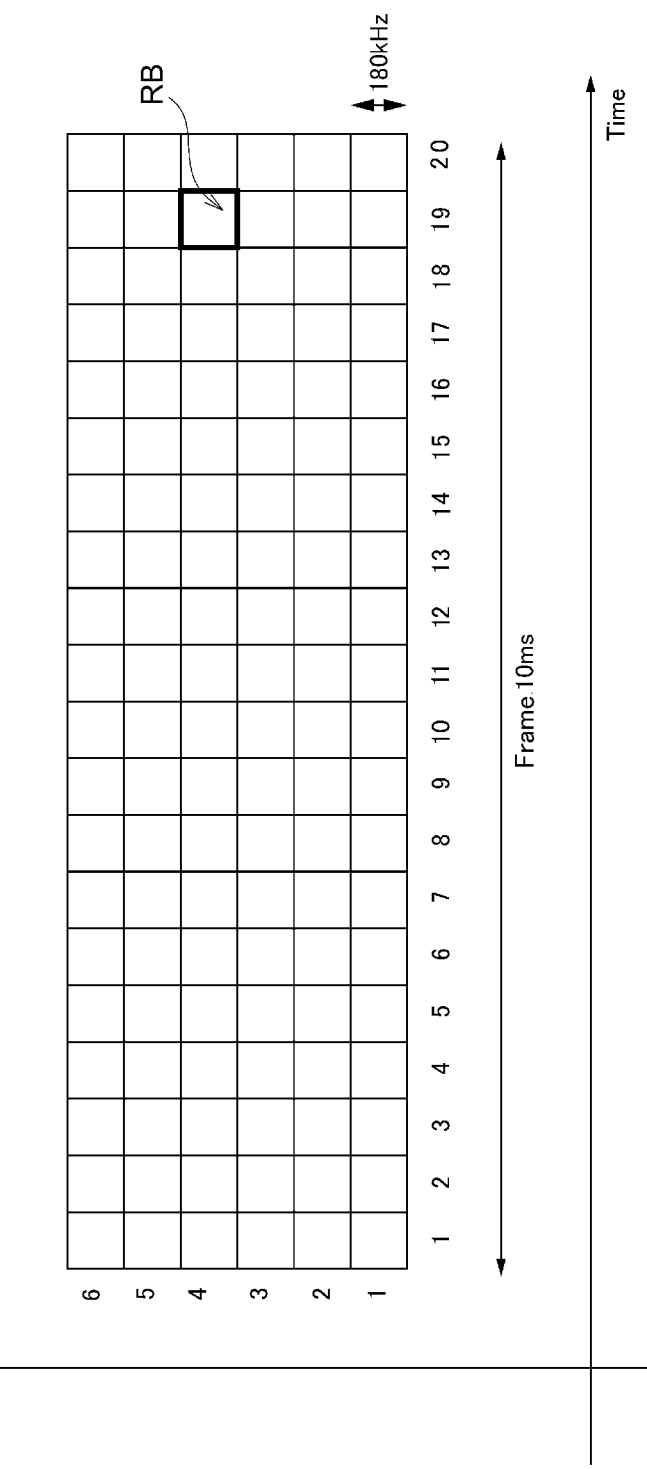
FIG. 5 is a diagram illustrating an example of a resource grid and resource blocks according to an embodiment.

FIG. 5 illustrates an example of a resource grid and resource blocks according to an embodiment in the present disclosure. FIG. 5 illustrates a 20×6 resource grid in the time direction and the frequency direction, with each unit cell in the resource grid being a resource block. In other words, there are 20×6=120 resource blocks in the resource grid in FIG. 5. The size of the resource blocks is not limited to 20×6, and it may be M×N (where M is an integer equal to or greater than 1 and N is an integer greater than or equal to 1).

Each resource block is constituted, for example, by one slot (0.5 ms)×12 sub-carriers (15×12=180 kHz). The configuration of each resource block is also not limited thereto.

In the respective DUs, downlinks to the RUs in a single frame are allocated (scheduled) in two resource block units that are consecutive in the time direction in the resource grid, in accordance with the usage conditions in each RU.

Additionally, hereinafter, for any DU among two or more DUs, the size of the resource grid in a single frame is the same, and the schedule is represented by the arrangement of resource blocks, for example, in a 20×6 resource block.

Figure 6:
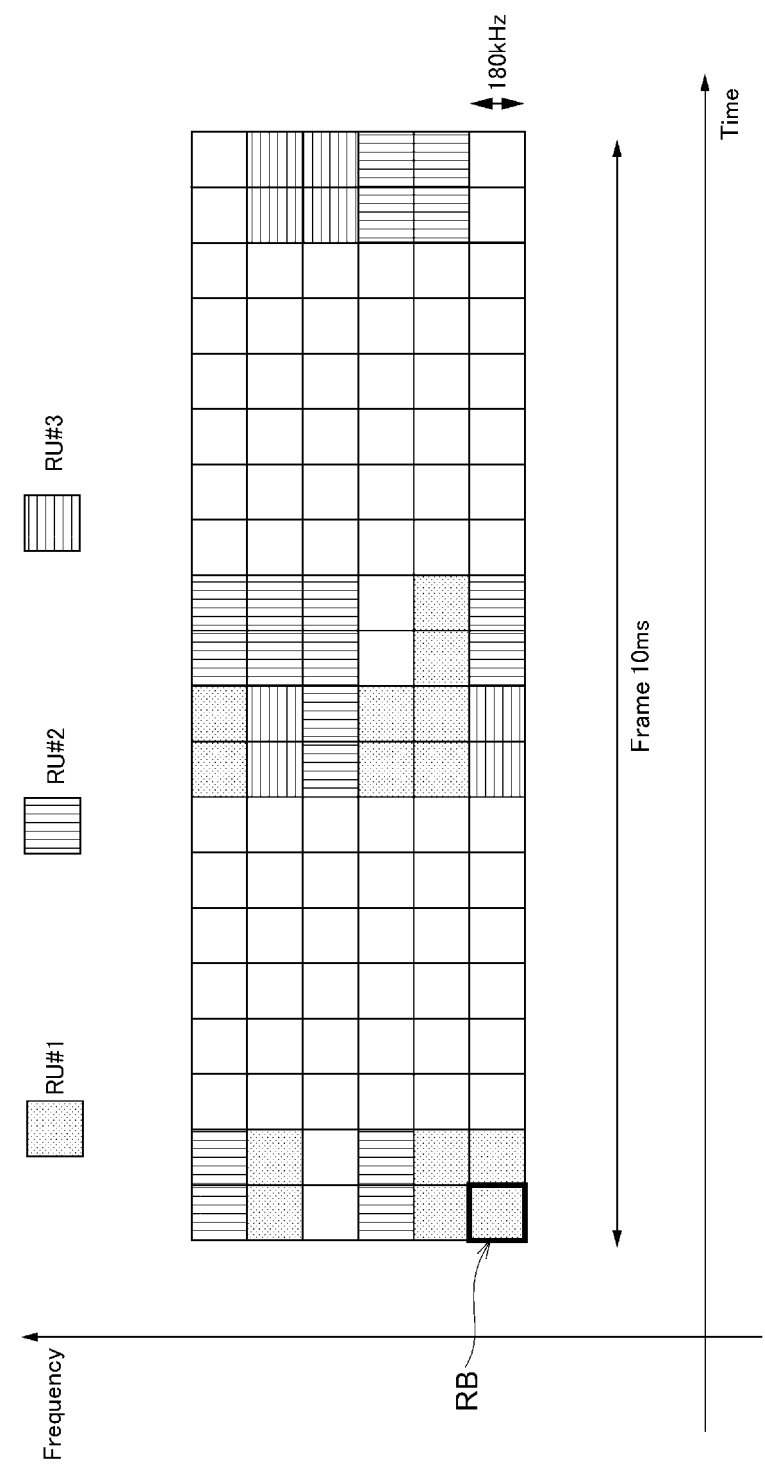
FIG. 6 is a diagram illustrating a first example of a resource block arrangement in a resource grid according to an embodiment.

FIG. 6 illustrates a first example of a resource block arrangement for downlinks to respective RUs in a resource grid for a DU according to an embodiment in the present disclosure. FIG. 6 illustrates the resource grid for the first DU (DU #1) before regrouping, and it is assumed that the first DU (DU #1) was connected to a first group of RUs (RU #1, RU #2, and RU #3).

The schedule of resource blocks that the first group of RUs (RU #1, RU #2, and RU #3) were to use in the first DU (DU #1) before regrouping will be called the "first schedule" below.

In other words, the multiple resource blocks managed by the DU #1 illustrated in FIG. 6 are divided between those allocated to the RU #1, those allocated to the RU #2, those allocated to the RU #3, and those not allocated to any of the RUs. In FIG. 6, the resource blocks allocated to the RU #1, the RU #2, or the RU #3 can be distinguished by means of color or lines. In FIG. 6, the resource blocks not allocated to any of the RU #1, the RU #2, or the RU #3 are indicated in white.

As also illustrated in FIG. 6, none of the resource blocks are allocated to two or more RUs. As a result thereof, downlinks to two or more RUs are separated in the time direction or in the frequency direction, and it can be assumed that, logically, there will be no interference between the RUs. In other words, interference is prevented by not allocating the same resource block to two or more RUs.

In the resource grid in FIG. 6, 14 resource blocks are allocated to the RU #1, 18 resource blocks are allocated to the RU #2, and eight resource blocks are allocated to the RU #3.

The control unit 120 in the management device 100 acquires, via the communication interface unit 110, the schedule (first schedule) of resource blocks that were to be used by the first group of RUs (RU #1, RU #2, and RU #3) in the first DU (DU #1) before regrouping. Regarding the first schedule, the control unit 120 may acquire, not the schedule of resource blocks illustrated in FIG. 6 itself, but rather other information associated with the first schedule, such as the number of resource blocks for each of the first group of RUs.

Figure 7:
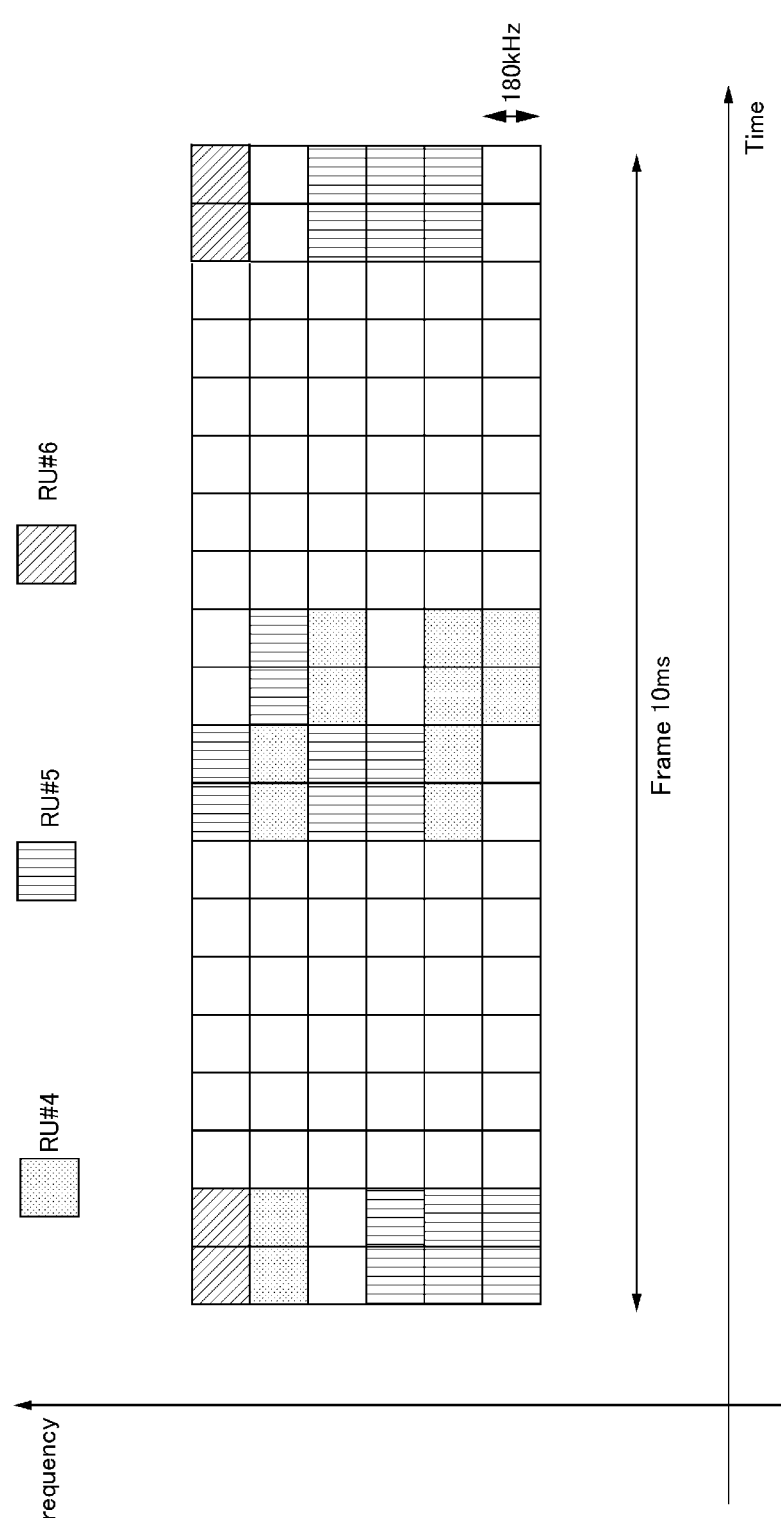
FIG. 7 is a diagram illustrating a second example of a resource block arrangement in a resource grid according to an embodiment.

FIG. 7 illustrates a second example of a resource block arrangement for downlinks to respective RUs in a resource grid for a DU according to an embodiment in the present disclosure. FIG. 7 illustrates the resource grid for the second DU (DU #2) before regrouping, in which it is assumed that the second DU (DU #2) was connected to a second group of RUs (RU #4, RU #5, and RU #6).

The schedule of resource blocks that the second group of RUs (RU #4, RU #5, and RU #6) were to use in the second DU (DU #2) before regrouping will be called the "second schedule" below.

In other words, the multiple resource blocks managed by the DU #2 illustrated in FIG. 7 are divided between those allocated to the RU #4, those allocated to the RU #5, those allocated to the RU #6, and those not allocated to any of the RUs.

In FIG. 7, the resource blocks allocated to the RU #4, the RU #5, or the RU #6 can be distinguished by means of color or lines. In FIG. 7, the resource blocks not allocated to any of the RU #4, the RU #5, or the RU #6 are indicated in white.

Additionally, in FIG. 7 also, none of the resource blocks are allocated to two or more RUs. Thus, downlinks to two or more RUs are separated in the time direction or in the frequency direction, thus preventing interference.

In the resource grid in FIG. 7, 12 resource blocks are allocated to the RU #4, 20 resource blocks are allocated to the RU #5, and four resource blocks are allocated to the RU #6.

The control unit 120 in the management device 100 acquires, via the communication interface unit 110, the schedule (second schedule) of resource blocks that were to be used by the second group of RUs (RU #4, RU #5, and RU #6) in the second DU (DU #2) before regrouping. Regarding the second schedule, the control unit 120 may acquire, not the schedule of resource blocks illustrated in FIG. 7 itself, but rather other information associated with the second schedule, such as the number of resource blocks for each of the second group of RUs.

Figure 8:
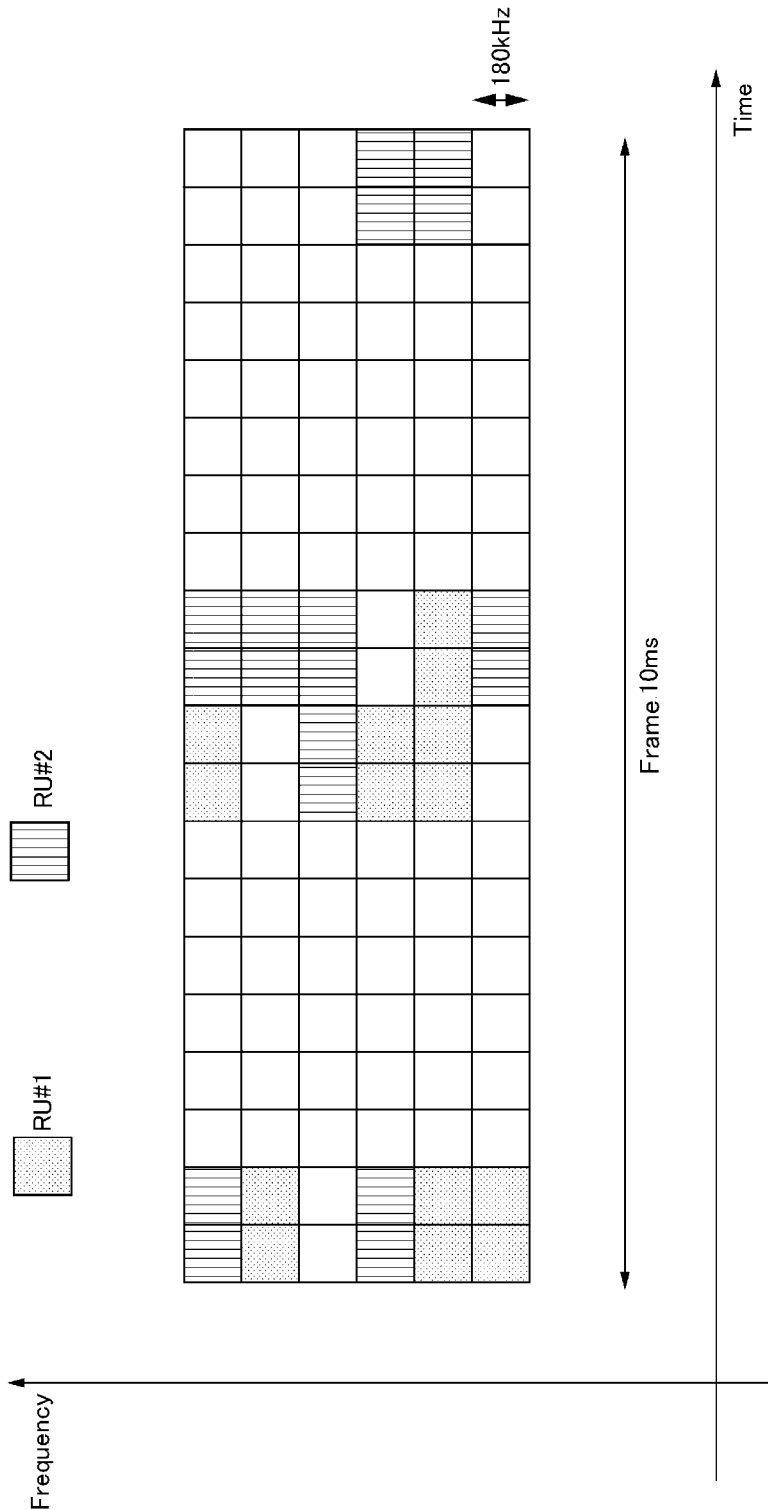
FIG. 8 is a diagram illustrating a third example of a resource block arrangement in a resource grid according to an embodiment.

Referring to FIG. 8 and the aforementioned FIG. 6, the reallocation of the resources in the first DU (DU #1) after the first RU (RU #3) that was connected to the first DU (DU #1) is regrouped so as to be connected to the second DU (DU #1) will be explained.

FIG. 8 illustrates a third example of a resource block arrangement for downlinks to respective RUs in a resource grid for a DU according to an embodiment in the present disclosure. FIG. 8 illustrates the resource grid for the first DU (DU #1) after regrouping. The first DU (DU #1), which was connected to the first group of RUs (RU #1, RU #2, and RU #3), is in a state in which the connection to the RU to be regrouped (RU #3) has been terminated. In other words, the first DU (DU #1) maintains the connection with the RUs (RU #1 and RU #2) other than the RU to be regrouped among the first group of RUs.

The resource block schedule used by the first DU (DU #1) after regrouping of the RUs (RU #1 and RU #2) other than the RU to be regrouped among the first group of RUs will be called the "third schedule" below.

With respect to the third schedule illustrated in FIG. 8, it is assumed that the allocation of resource blocks in the first DU (DU #1) before termination of the connection with the RU to be regrouped (RU #3) was the first schedule illustrated in FIG. 6.

As mentioned above, in the resource grid in FIG. 6, for the first group of RUs, 14 resource blocks are allocated to the RU #1, 18 resource blocks are allocated to the RU #2, and eight resource blocks are allocated to the RU #3.

In this case, when the first DU (DU #1) terminates the connection with the RU to be regrouped (RU #3), what needs to be reallocated to the RUs other than the RU to be regrouped (RU #3) among the first group of RUs are 14 resource blocks for the RU #1 and 18 resource blocks for the RU #2. In other words, the eight resource blocks for the RU to be regrouped (RU #3) are no longer needed after the connection is terminated.

In the third schedule illustrated in FIG. 8, after the connection with the RU to be regrouped (RU #3) has been terminated, the resource blocks that were allocated to the RU to be regrouped (RU #3) in the first schedule (FIG. 6) before the termination of the connection are deleted and deallocated. Furthermore, the first DU (DU #1) after the connection with the RU to be regrouped (RU #3) has been terminated is indicated as reallocating resource blocks to the RUs (RU #1 and RU #2) other than the RU to be grouped among the first group of RUs.

In other words, the resource blocks that were allocated to the RU to be regrouped (RU #3) in FIG. 6 are white in FIG. 8. Furthermore, the resource blocks that were allocated to the RUs (RU #1 and RU #2) other than the RU to be grouped among the first group of RUs in FIG. 6 are allocated, in the same number and at the same positions, in FIG. 8 as well.

In the first DU (for example, DU #1), the manner in which the resource blocks are reallocated to the remaining RUs (for example, RU #1 and RU #2) after the connection with the RU to be regrouped (for example, RU #3) has been terminated is not limited to simply having the resource blocks that were allocated to the RU (RU #3) with which the connection has been terminated be deallocated, while maintaining the allocation of the resource blocks to the remaining RUs (RU #1 and RU #2).

For example, the resource blocks that were allocated to the RU (RU #3) with which the connection has been terminated may be deallocated, and the resource blocks that were allocated to the remaining RUs (RU #1 and RU #2) may be randomly rearranged in the resource grid.

Alternatively, the resource blocks that were allocated to the RU (RU #3) with which the connection has been terminated may be deallocated and the resource blocks that were allocated to the remaining RUs (RU #1 and RU #2) may be rearranged within the resource grid. During rearrangement, the resource blocks being allocated may be determined by considering priority levels that are predefined for the respective resource blocks. Additionally, a priority level may be defined for each RU, and the resource blocks to be allocated may be determined from among the RUs with high priority levels.

In the DU (DU #1) in which the connection with the RU to be regrouped (RU #3) is to be terminated, even after reallocation, as long as there are no resource blocks that are allocated to two or more RUs, the downlinks to the remaining RUs (RU #1 and RU #2) are separated in the time direction or in the frequency direction, thus allowing interference to be prevented.

Figure 9:
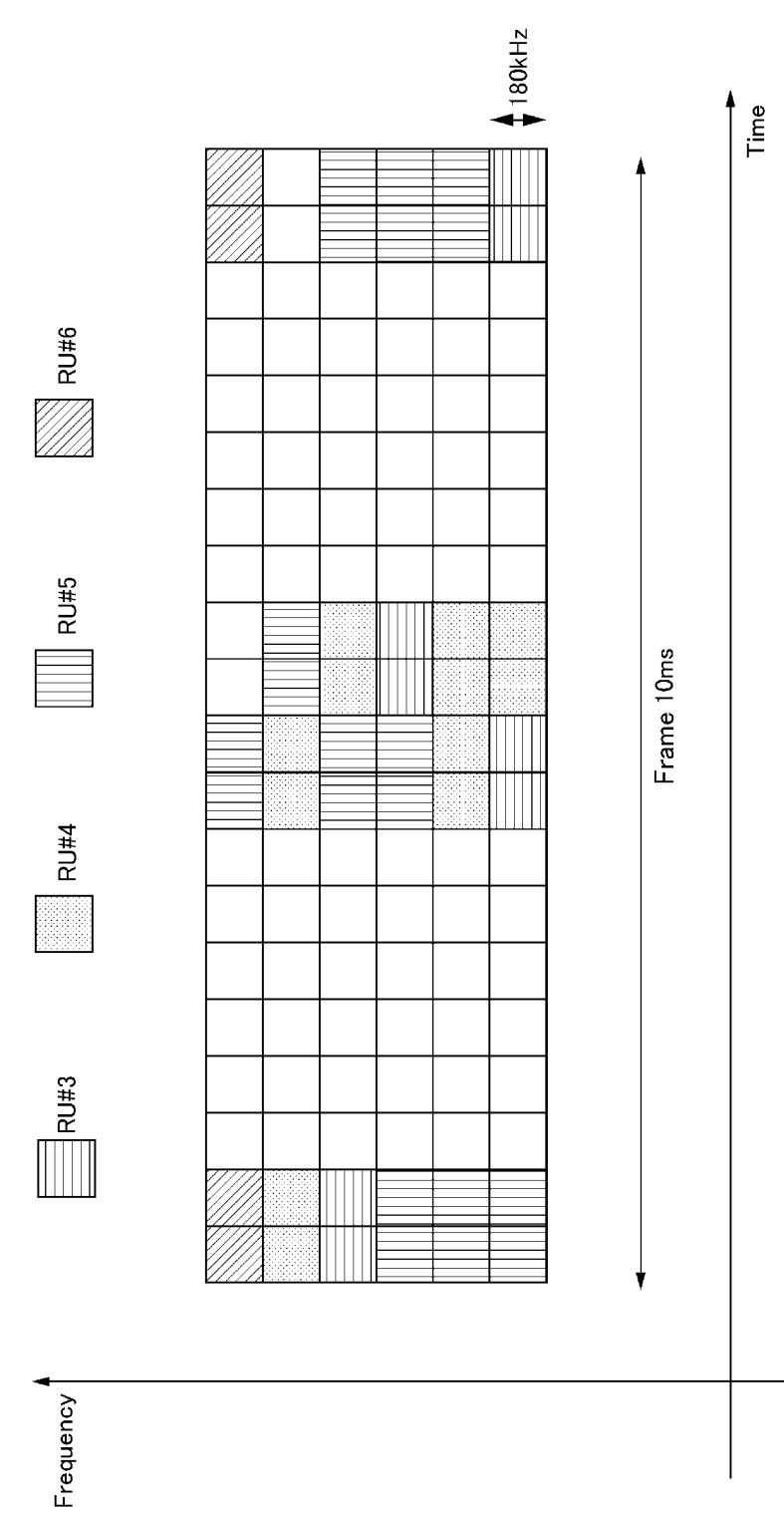
FIG. 9 is a diagram illustrating a fourth example of a resource block arrangement in a resource grid according to an embodiment.

Referring to FIG. 9 and the aforementioned FIG. 6, FIG. 7 and FIG. 8, the reallocation of the resources in the second DU (DU #2) after the first RU (RU #3) that was connected to the first DU (DU #1) has been newly connected will be explained.

FIG. 9 illustrates a fourth example of a resource block arrangement for downlinks to respective RUs in a resource grid for a DU according to an embodiment in the present disclosure. FIG. 9 illustrates the resource grid for the second DU (DU #2) after regrouping. The second DU (DU #2) maintains the connection with the second group of RUs (RU #4, RU #5, and RU #6). In addition thereto, the RU to be regrouped (RU #3), which was connected with the first DU (DU #1) before regrouping, is in a state of having terminated the connection with the first DU (DU #1) and being newly connected with the second DU (DU #2). In other words, the second DU (DU #2) is connected to the RU to be regrouped (RU #3) and the second group of RUs (RU #4, RU #5, and RU #6).

The resource block schedule that the RU to be regrouped (RU #3) and the second group of RUs (RU #4, RU #5, and RU #6) use in the second DU (DU #2) after regrouping will be called the "fourth schedule" below.

It is assumed that the allocation of resource blocks in the second DU (DU #2) before connecting with the RU to be regrouped (RU #3) was the second schedule illustrated in FIG. 7.

In the resource grid in FIG. 6, eight resource blocks were allocated to the RU to be regrouped (RU #3) in the first DU (DU #1).

Furthermore, in the resource grid in FIG. 7, for the second group of RUs, 12 resource blocks were allocated to the RU #4, 20 resource blocks were allocated to the RU #5, and four resource blocks were allocated to the RU #6.

In this case, when the second DU (DU #2) connects with the RU to be regrouped (RU #3), what needs to be reallocated are the eight resource blocks for the RU to be regrouped (RU #3), and the 12 resource blocks for the RU #4, the 20 resource blocks for the RU #5, and the four resource blocks for the RU #6, which were originally allocated to the second group of RUs.

In the second DU (DU #2), even after reallocation, as long as there are no resource blocks that are allocated to two or more RUs, the downlinks to the RU to be regrouped (RU #3) that is connected to the second DU (DU #2) and the second group of RUs (RU #4, RU #5, and RU #6) with which connections are maintained are separated in the time direction or in the frequency direction, thus allowing interference between those RUs (RU #3, RU #4, RU #5, and RU #6) to be prevented.

For example, in FIG. 9, the resource blocks that were allocated to the second group of RUs (RU #4, RU #5, and RU #6) originally connected to the second DU (DU #2) in the second schedule in FIG. 7 are allocated to the same positions in the fourth schedule in FIG. 9.

On the other hand, referring to FIG. 9, in the regrouped second DU (DU #2), the eight resource blocks for the RU to be regrouped (RU #3) are not allocated to time and frequency positions that are the same as those of the resource blocks allocated to the second group of RUs (RU #4, RU #5, and RU #6) in FIG. 9.

If there is no overlap between the resource blocks that the DU #1 allocated to the RU #3 and the resource blocks that the DU #2 allocated to the RU #4 to the RU #6, then the DU #2 may simply allocate, to the RU #3, the resource blocks that the DU #1 allocated to the RU #3, without changing the resource blocks allocated to the RU #4 to the RU #6.

Additionally, if there is some overlap between the resource blocks that the DU #1 allocated to the RU #3 and the resource blocks that the DU #2 allocated to the RU #4 to the RU #6, as illustrated in FIG. 6 and FIG. 7, then the DU #2 may, for example, rearrange the resource blocks that were allocated to the RU #4 to the RU #6 to open the resource blocks that the DU #1 allocated to the RU #3, and may simply allocate, to the RU #3, the resource blocks that the DU #1 allocated to the RU #3.

Additionally, if it is desirable to make the RU #3 communicate in a specific slot, in other words, at a specific time, but none of the resource blocks for that slot are open, then the DU #2 may rearrange the resource blocks that were allocated to the RU #4 to the RU #6 to open up at least one or more resource blocks in that slot, and may allocate the opened resource blocks to the RU #3.

Meanwhile, interference must also be avoided between the RUs (RU #3, RU #4, RU #5, and RU #6) connected to the second DU (DU #2) after reallocation and the RUs (RU #1 and RU #2) connected to the first DU (DU #1) after reallocation.

In particular, the resource blocks in the first DU (DU #1) after regrouping and the resource blocks in the second DU (DU #2) after regrouping must be reallocated to avoid interference between the RU to be regrouped (RU #3) and the first group of RUs (RU #1 and RU #2).

For this reason, the resource blocks allocated to the RU to be regrouped (RU #3) illustrated in FIG. 9 and the resource blocks allocated to the first group of RUs (RU #1 or RU #2) that maintain connections with the first DU (DU #1) illustrated in FIG. 8 are kept from being at the same time and frequency positions.

In some cases, the directionality of antennas or the like can keep interference from occurring between the RU to be regrouped (RU #3) and the RUs (RU #1 and RU #2) other than the RU to be regrouped in the first group of RUs. In other words, in some cases, interference does not occur between the RU #3 and the RU #1, and between the RU #3 and the RU #2.

Additionally, in some cases, the directionality of antennas or the like can keep interference from occurring between the RU to be regrouped (RU #3) and some of the RUs (RU #1 and RU #2) other than the RU to be regrouped in the first group of RUs. In other words, in some cases, interference occurs between the RU #3 and the RU #1, yet interference does not occur between the RU #3 and the RU #2. Alternatively, in some cases, interference occurs between the RU #3 and the RU #2, yet interference does not occur between the RU #3 and the RU #1.

Thus, in some cases, the directionality of antennas or the like may prevent at least some interference from occurring between the RU to be regrouped (RU #3) and the RUs (RU #1 and RU #2) other than the RU to be regrouped in the first group of RUs.

In such cases, for example, the resource blocks allocated to the RU #3 in the fourth schedule, as in FIG. 9, do not need to be strictly limited to avoid time and frequency positions that are the same as "all" resource blocks allocated to the RU #1 or the RU #2 in the third schedule in FIG. 8.

For example, if interference will not occur between the RU #3 and the RU #1, and between the RU #3 and the RU #2, then the resource blocks allocated to the RU #3 in the fourth schedule can be arranged without any particular regard for the time and frequency positions of the resource blocks allocated to the RU #1 or the RU #2 in the third schedule (FIG. 8). In particular, the time and frequency positions of the resource blocks allocated to the RU #3 in the fourth schedule may be the same as the time and frequency positions of the resource blocks allocated to the RU #1 or the RU #2 in the third schedule (FIG. 8).

In other words, it should be noted that, under circumstances in which there is no interference between all of the RUs connected with the first DU in the third schedule after regrouping and all of the RUs connected with the second DU in the fourth schedule after regrouping, interference will not occur between the RUs connected with the first DU and the second DU after regrouping.

That is to say, suppose that there is a first resource block in the third schedule and there is a second resource block in the fourth schedule, located at the same time and frequency position on the resource grid. In this case, if interference is prevented from occurring between the first RU and the second RU, for example, due to the directionality of the antennas in the RUs or the like, then the first resource block may be allocated to the first RU and the second resource block may be allocated to the second RU.

For example, consider a 20×6 resource grid in which the time and frequency positions therein are represented by (m, n). In this case, m and n are integers satisfying the expressions $1 \le m \le 20$ and $1 \le n \le 6$. When m and n are respectively moved within the range from 1 to 20 and from 1 to 6, if the position (m, n) in the resource grid of the third schedule is not allocated to either of the RUs, or if the position (m, n) in the resource grid of the fourth schedule is not allocated to either of the RUs, then interference caused by allocation of the resource blocks will not occur.

However, suppose that when m and n are respectively moved within the ranges from 1 to 20 and from 1 to 6, a first resource block that was allocated to the RU #a (RU #a being one of the RUs, among the first group of RUs, that remain connected with the first DU even after regrouping) is located at the position (m, n) in the resource grid of the third schedule. Additionally, suppose that a second resource block that was allocated to the RU #b (RU #b being one of the RUs among the second group of RUs and the RU to be regrouped) is located at the position (m, n) in the resource grid of the fourth schedule.

At this time, if interference is prevented from occurring between the RU #a using the first resource block and the RU #b using the second resource block, for example, due to the directionality of the antennas, then resource blocks located at the same position on the resource grids may be allocated to the first RU connected to the first DU and the second RU connected to the second DU.

Furthermore, the manner in which the resource blocks are reallocated after the second DU (DU #2) has been newly connected with the RU to be regrouped (RU #3), which was connected with the first DU (DU #1), is not limited to that indicated above, as long as interference is prevented between the RUs connected to the first DU (DU #1) and the second DU (DU #2) (between RUs that are one each selected from the group consisting of RU #1 and RU #2, and from the group consisting of RU #3, RU #4, RU #5, and RU #6).

For example, the resource blocks of the RUs remaining connected with the second DU (DU #2) from before the regrouping may be randomly rearranged in the resource grid.

Alternatively, the resource blocks of the RUs remaining connected with the second DU (DU #2) from before the regrouping may be rearranged in the resource grid by priority level.

Returning to the explanation of the control unit 120 in the management device 100 in FIG. 2, the control unit 120 determines the third schedule after regrouping and the fourth schedule after regrouping based on information regarding the first schedule and information regarding the second schedule.

When doing so, the control unit 120, as mentioned above, prevents interference from occurring between all of the RUs (RU #1 and RU #2) connected with the first DU (DU #1) in the third schedule and all of the RUs (RU #3, RU #4, RU #5, and RU #6) connected with the second DU (DU #2) after regrouping in the fourth schedule.

The control unit 120 supplies the third schedule after regrouping to the first DU (DU #1) via the communication interface unit 110. Additionally, the control unit 120 supplies the fourth schedule after regrouping to the second DU (DU #2) via the communication interface unit 110.

Furthermore, the control unit 120 instructs the first DU (DU #1), via the communication interface unit 110, to terminate the connection with the RU to be regrouped (RU #3).

The control unit 120 can supply the third schedule after regrouping to the first DU (DU #1) simultaneously with the instruction to terminate the connection with the RU to be regrouped (RU #3). Alternatively, the control unit 120 may supply the third schedule to the first DU (DU #1) before the instruction to terminate the connection with the RU to be regrouped (RU #3).

Furthermore, the control unit 120 instructs the second DU (DU #2), via the communication interface unit 110, to establish a connection with the RU to be regrouped (RU #3).

In this case, the control unit 120 may instruct the second DU (DU #2) to establish a connection with the RU to be regrouped (RU #3) simultaneously with or after instructing the first DU (DU #1) to terminate the connection with the RU to be regrouped (RU #3).

The control unit 120 can supply the fourth schedule after regrouping to the second DU (DU #2) simultaneously with the instruction to establish the connection with the RU to be regrouped (RU #3). Alternatively, the control unit 120 may supply the fourth schedule to the second DU (DU #2) before the instruction to establish the connection with the RU to be regrouped (RU #3).

Thereafter, the control unit 120 instructs the first DU (DU #1), via the communication interface unit 110, to implement control for communicating with the RUs connected with the first DU based on the third schedule after regrouping.

Furthermore, the control unit 120 instructs the second DU (DU #2), via the communication interface unit 110, to implement control for communicating with the RUs connected with the second DU based on the fourth schedule after regrouping.

Figure 10:
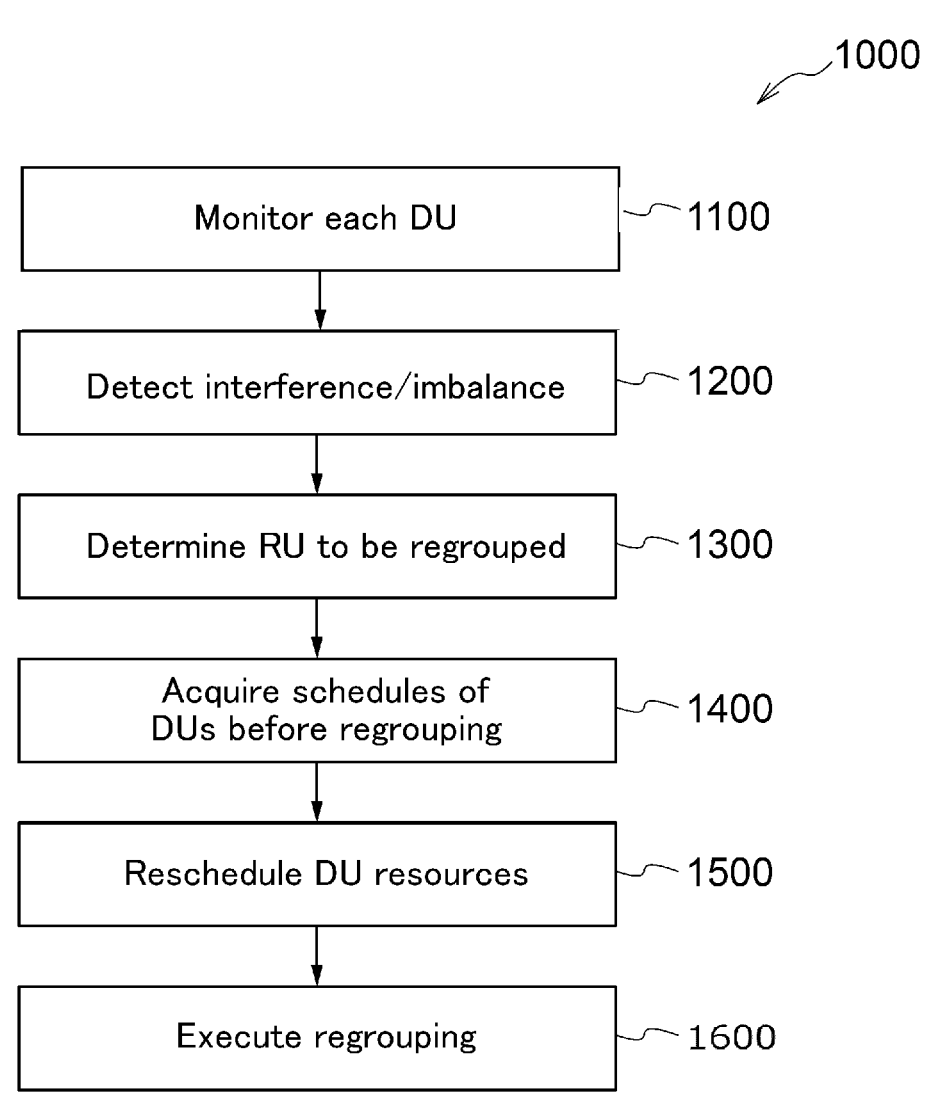
FIG. 10 is a flow chart illustrating a RAN management method according to an embodiment.

FIG. 10 is a flow chart illustrating an example of a RAN management method 1000 executed by one or more processors.

This management method 1000 provides, in a first DU to which a first group of RUs is communicably connected and a second DU to which a second group of RUs is communicably connected, a method of regrouping the DU to which an RU is connected. The present method is contemplated as being executed in a management device 100. However, some of the processes, for example, the monitoring of the DUs, may be executed by devices other than the management device 100. In other words, the present method may be executed by distributed processing by multiple devices.

First, the respective DUs are monitored (reference number 1100 in FIG. 10). The monitoring allows the detection of the fulfillment (triggering) of predefined "regrouping" execution conditions, such as there being insufficient resources in the DUs or the occurrence of interference between different DUs (reference number 1200 in FIG. 10). The monitoring may involve polling the DUs or the acquisition of a Syslog.

Next, the monitoring results from the respective DUs are analyzed to determine the RU to be regrouped, the (regrouping source) DU connected therewith and the connection destination (regrouping destination) DU after the change (reference number 1300 in FIG. 10).

Next, information regarding the resource schedules (the first schedule and the second schedule respectively) that the regrouping source DU and the regrouping destination DU were to use before the regrouping is obtained (reference number 1400 in FIG. 10).

Next, based on the information regarding the resource schedules (the first schedule and the second schedule respectively) that the regrouping source DU and the regrouping destination DU were to use before the regrouping, resource schedules (the third schedule and the fourth schedule respectively) that should be used by the regrouping source DU and the regrouping destination DU after the regrouping are reset (reference number 1500 in FIG. 10).

Next, the connection destination is regrouped from the regrouping source DU to the regrouping destination DU for the RU selected as the RU for which the connection destination is to be regrouped from the regrouping source DU to the regrouping destination D (reference number 1600 in FIG. 10). The reset resource schedules (the third schedule and the fourth schedule respectively) are used in the regrouping source DU and the regrouping destination DU after the regrouping.

The above-mentioned flow chart is merely one example, and the order of the processes may be interchanged, as appropriate, as long as the desired result can be obtained (in other words, as long as resource block allocation in which interference does not occur can be performed). For example, if the first schedule and the second schedule are not changed for a certain period of time, then the first schedule and the second schedule may be acquired by the management device 100 at the moment they are generated, in other words, before the processes 1100 and 1200 in FIG. 10.

Furthermore, a program for making one or more processors execute the above-mentioned management method is also included in the present disclosure. Said program may be provided by being recorded on a computer-readable non-transitory storage medium.

The program may be stored in a volatile or non-volatile memory unit 140 for operating the processor 130 in the control unit 120 in the management device 100 in FIG. 2.

Furthermore, in a base station as indicated in FIG. 1, aside from interference occurring, there are sometimes imbalances in the resources used in the respective RUs and the respective DUs. The fact that the present disclosure may also contribute to mitigating such imbalances in used resources will be explained with reference to FIG. 11.

Figure 11:
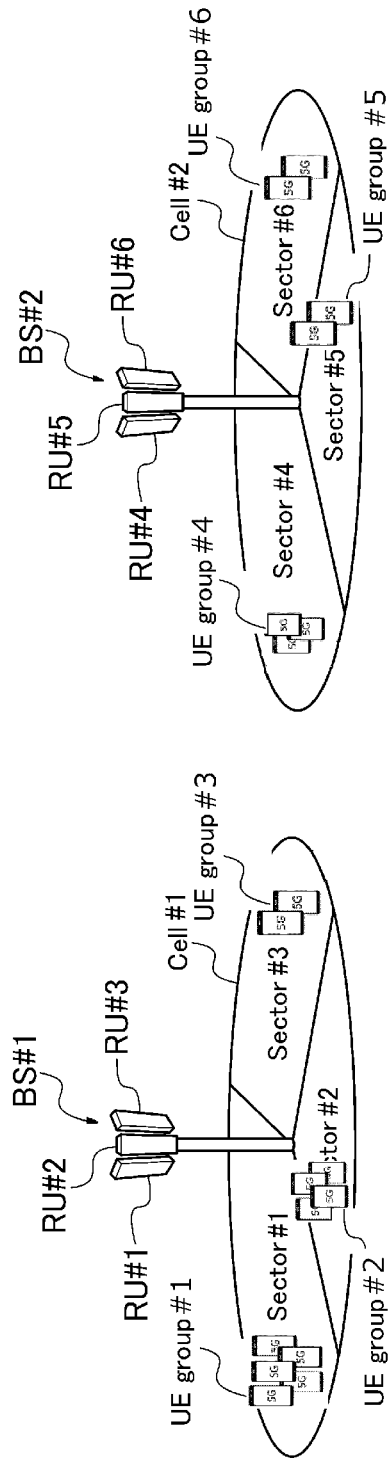
FIG. 11 is a diagram illustrating an example of a load in a coverage area formed by two base stations.

FIG. 11 illustrates an example of circumstances in which user terminals (UEs) located in sectors corresponding to the respective RUs perform radio communication in the coverage area formed by the BS #1 and the BS #2 illustrated in FIG. 1.

For the BS #1, there is a UE group #1 in the sector #1 corresponding to the RU #1, there is a UE group #2 in the sector #2 corresponding to the RU #2, and there is a UE group #3 in the sector #3 corresponding to the RU #3.

For the BS #2, there is a UE group #4 in the sector #4 corresponding to the RU #4, there is a UE group #5 in the sector #5 corresponding to the RU #5, and there is a UE group #6 in the sector #6 corresponding to the RU #6.

In this case, although the UE group #1 to the UE group #6 are illustrated as having various numbers of UEs, this merely indicates symbolically that the UE group #1 to the UE group #6 have non-uniform communication demand in the sector #1 and the sector #2.

Since the respective RUs connect with DUs and form base stations together with CUs, the resources used in the respective RUs are reflected in the amounts of resources (radio resources such as frequency band and transmission power, and/or physical resources such as memory) in the DUs that are allocated to the respective RUs. In this case, imbalances in the resources used between the RUs lead to imbalances in the resources allocated in the DUs.

The case in which a much larger amount of resources is used in the DU #1 than in the DU #2 will be explained as an example. In other words, there is an imbalance in the used resources between the DU #1, which uses a very large amount of resources, and the DU #2, which does not use such a large amount of resources. As illustrated in FIG. 4, if the connection of the RU #3 is changed from the DU #1 to the DU #2 due to the connection regrouping, the used resources that are used by the RU #3 are transferred from the DU #1 to the DU #2. Thus, the imbalance in the used resources between the DU #1 and the DU #2 can be expected to be mitigated.

Thus, even in the case in which there is an imbalance in the used resources between the DUs, the circumstances can sometimes be improved by regrouping the connections to change the connection destination DU of the RU illustrated in FIG. 4.

Furthermore, according to the management device and the management method in the present disclosure, interference will not newly occur even when regrouping the DU to which the RU #3 is connected.

Additionally, in general, many base stations are installed in 5G mobile communication systems. However, when installing a base station, an operator manages operations, such as by adjusting the installation location or the orientation of the antenna, so that there will be no interference with other base stations. However, if the operator must perform the operation management each time a base station is added, then the operator work becomes burdensome. In response thereto, if the management device 100 according to an embodiment of the present disclosure is used, then interference can be avoided by connecting RUs between which interference is occurring to the same DU, thereby making operator work unnecessary.

The present disclosure is not limited to the embodiments mentioned above, and includes various modified examples in which constituent elements have been added, removed or replaced with respect to the configurations indicated above. Additionally, the respective examples may be combined in various ways.

The expression "connect" used in the present description refers to a logical connection for the purpose of communication. For example, "an RU connected to a DU" refers to the DU and the RU being logically connected so as to be communicable. There is no need for the DU and the RU to be directly connected in a physical manner, with a physical cable or the like, and there may be multiple devices and radio communications between the DU and the RU.

Furthermore, the present disclosure includes the embodiments indicated below.

[1] A management device communicably connected with a first DU communicably connected with a first group of RUs and a second DU communicably connected with a second group of RUs, wherein the management device comprises one or more processors that,
when regrouping an RU to be regrouped among the first group of RUs by terminating a connection with the first DU and newly communicably connecting with the second DU, execute processes of:
acquiring information regarding a first schedule, which is a resource block schedule followed by the first group of RUs before the regrouping;
acquiring information regarding a second schedule, which is a resource block schedule followed by the second group of RUs before the regrouping;
generating, based on at least the information regarding the first schedule and the information regarding the second schedule, a third schedule, which is a resource block schedule to be followed by the first group of RUs after the regrouping, and a fourth schedule, which is a resource block schedule to be followed by the second group of RUs after the regrouping, wherein the third schedule and the fourth schedule are assumed to be such that interference will not logically occur between the RU that was regrouped and the other RUs included in the first group and in the second group after the regrouping; and
supplying the third schedule and the fourth schedule to the first DU and the second DU, respectively.

[2] The management device according to [1], wherein, in the fourth schedule, a resource block for the RU to be regrouped is added at a time and frequency position that is not allocated to any of the RUs in the second schedule.

[3] The management device according to [1] or [2], wherein, in the third schedule, a resource block for the RU to be regrouped is deleted from the first schedule.

[4] The management device according to any one of [1] to [3], wherein, in the third schedule and the fourth schedule, for a first resource block in the third schedule and a second resource block in the fourth schedule, which are both located at the same time and frequency position, interference is prevented from occurring between a first RU using the first resource block and a second RU using the second resource block.

[5] The management device according to any one of [1] to [4], wherein the one or more processors further execute processes of:
supplying the first DU with an instruction to terminate the connection with the RU to be regrouped;
supplying the second DU with an instruction to establish a connection with the RU to be regrouped;
supplying the first DU with a communication instruction based on the third schedule; and
supplying the second DU with a communication instruction based on the fourth schedule.

[6] A method for managing a radio access network including a first DU communicably connected with a first group of RUs and a second DU communicably connected with a second group of RUs, wherein the method includes,
when regrouping an RU to be regrouped among the first group of RUs by terminating a connection with the first DU and newly communicably connecting with the second DU:

acquiring information regarding a first schedule, which is a resource block schedule followed by the first group of RUs before the regrouping;

acquiring information regarding a second schedule, which is a resource block schedule followed by the second group of RUs before the regrouping;

generating, based on at least the information regarding the first schedule and the information regarding the second schedule, a third schedule, which is a resource block schedule to be followed by the first group of RUs after the regrouping, and a fourth schedule, which is a resource block schedule to be followed by the second group of RUs after the regrouping, wherein the third schedule and the fourth schedule are assumed to be such that interference will not logically occur between the RU that was regrouped and the other RUs included in the first group and in the second group after the regrouping; and supplying the third schedule and the fourth schedule to the first DU and the second DU, respectively.

[7]A program for one or more processors, wherein the program, when executed by the one or more processors, makes the one or more processors execute processes of, in a first DU communicably connected with a first group of RUs and a second DU communicably connected with a second group of RUs, when regrouping an RU to be regrouped among the first group of RUs by terminating a connection with the first DU and newly communicably connecting with the second DU:

acquiring information regarding a first schedule, which is a resource block schedule followed by the first group of RUs before the regrouping;

acquiring information regarding a second schedule, which is a resource block schedule followed by the second group of RUs before the regrouping;

generating, based on at least the information regarding the first schedule and the information regarding the second schedule, a third schedule, which is a resource block schedule to be followed by the first group of RUs after the regrouping, and a fourth schedule, which is a resource block schedule to be followed by the second group of RUs after the regrouping, wherein the third schedule and the fourth schedule are assumed to be such that interference will not logically occur between the RU that was regrouped and the other RUs included in the first group and in the second group after the regrouping; and supplying the third schedule and the fourth schedule to the first DU and the second DU, respectively.

REFERENCE SIGNS LIST

100 Management device
110 Communication interface unit
120 Control unit
130 Processor
140 Memory unit
200 RAN
210 CU
220, 220-1, 220-2 DU
230, 230-1, 230-2, 230-3, 230-4, 230-5, 230-6 RU

The invention claimed is:

1. A management device communicably connected with a first Distributed Unit (DU) communicably connected with a first group of Radio Units (RUs) and a second DU communicably connected with a second group of RUs, the first DU comprising a first memory and the second DU comprising a second memory, wherein the management device comprises one or more processors that, when regrouping an RU to be regrouped among the first group of RUs by terminating a connection of the RU with the first DU and newly communicably connecting with the RU the second DU, execute processes of:

acquiring information regarding a first schedule, which is a resource block schedule followed by the first group of RUs before the regrouping;

acquiring information regarding a second schedule, which is a resource block schedule followed by the second group of RUs before the regrouping;

generating a third schedule, which is a resource block schedule to be followed by the first group of RUs after the regrouping, and a fourth schedule, which is a resource block schedule to be followed by the second group of RUs after the regrouping;

configuring, based on the information regarding the first schedule and the information regarding the second schedule, the third schedule and the fourth schedule as to prevent interference between a schedule of the RU that was regrouped, a schedule of the other RUs included in the first group, and a schedule of the second group, after the regrouping; and supplying the third schedule and the fourth schedule to the first DU and the second DU, respectively.

2. The management device according to claim 1, wherein, in the fourth schedule, a resource block for the RU to be regrouped is added at a time and frequency position that is not allocated to any of the RUs in the second schedule.

3. The management device according to claim 1, wherein, in the third schedule, a resource block for the RU to be regrouped is deleted from the first schedule.

4. The management device according to claim 1, wherein, in the third schedule and the fourth schedule, for a first resource block in the third schedule and a second resource block in the fourth schedule, which are both located at the same time and frequency position, interference is prevented from occurring between a first RU using the first resource block and a second RU using the second resource block.

5. The management device according to claim 1, wherein the one or more processors further execute processes of:

supplying the first DU with an instruction to terminate the connection with the RU to be regrouped;

supplying the second DU with an instruction to establish a connection with the RU to be regrouped;

supplying the first DU with a communication instruction based on the third schedule; and supplying the second DU with a communication instruction based on the fourth schedule.

6. A method for managing a radio access network including a first Distributed Unit (DU) communicably connected with a first group of Radio Units (RUs) and a second DU communicably connected with a second group of RUs, the first DU comprising a first memory and the second DU comprising a second memory, wherein the method includes, when regrouping an RU to be regrouped among the first group of RUs by terminating a connection of the RU with the first DU and newly communicably connecting the RU with the second DU:

acquiring information regarding a first schedule, which is a resource block schedule followed by the first group of RUs before the regrouping;

acquiring information regarding a second schedule, which is a resource block schedule followed by the second group of RUs before the regrouping;

generating a third schedule, which is a resource block schedule to be followed by the first group of RUs after the regrouping, and a fourth schedule, which is a resource block schedule to be followed by the second group of RUs after the regrouping;

configuring, based on the information regarding the first schedule and the information regarding the second schedule, the third schedule and the fourth schedule as to prevent interference between a schedule of the RU that was regrouped, a schedule of the other RUs included in the first group, and a schedule of the second group, after the regrouping; and supplying the third schedule and the fourth schedule to the first DU and the second DU, respectively.

7. A computer-readable non-transitory storage medium storing program commands for one or more processors, wherein the program commands, when executed by the one or more processors, make the one or more processors execute processes of, in a first Distributed Unit (DU) communicably connected with a first group of Radio Units (RUs) and a second DU communicably connected with a second group of RUs, the first DU comprising a first memory and the second DU comprising a second memory, when regrouping an RU to be regrouped among the first group of RUs by terminating a connection of the RU with the first DU and newly communicably connecting the RU with the second DU:

acquiring information regarding a first schedule, which is a resource block schedule followed by the first group of RUs before the regrouping;

acquiring information regarding a second schedule, which is a resource block schedule followed by the second group of RUs before the regrouping;

generating a third schedule, which is a resource block schedule to be followed by the first group of RUs after the regrouping, and a fourth schedule, which is a resource block schedule to be followed by the second group of RUs after the regrouping;

configuring, based on the information regarding the first schedule and the information regarding the second schedule, the third schedule and the fourth schedule as to prevent interference between a schedule of the RU that was regrouped, a schedule of the other RUs included in the first group, and a schedule of the second group, after the regrouping; and supplying the third schedule and the fourth schedule to the first DU and the second DU, respectively.

* * * * *